(12) United States Patent
Higashi et al.

(10) Patent No.: US 11,396,325 B2
(45) Date of Patent: Jul. 26, 2022

(54) STEERING SYSTEM

(71) Applicant: JTEKT CORPORATION, Osaka (JP)

(72) Inventors: Masayasu Higashi, Kashihara (JP); Daisuke Miki, Kashihara (JP); Robert Fuchs, Nara (JP)

(73) Assignee: JTEKT CORPORATION, Kariya (JP)

( * ) Notice: Subject to any disclaimer, the term of this patent is extended or adjusted under 35 U.S.C. 154(b) by 291 days.

(21) Appl. No.: 16/821,185

(22) Filed: Mar. 17, 2020

(65) Prior Publication Data

US 2020/0307688 A1 Oct. 1, 2020

(30) Foreign Application Priority Data

Mar. 25, 2019 (JP) .............................. JP2019-056999

(51) Int. Cl.
*B62D 6/10* (2006.01)
*B62D 5/04* (2006.01)
*B62D 6/00* (2006.01)

(52) U.S. Cl.
CPC ............. *B62D 6/10* (2013.01); *B62D 5/0421* (2013.01); *B62D 6/006* (2013.01)

(58) Field of Classification Search
CPC ......... B62D 6/10; B62D 5/0421; B62D 6/006
See application file for complete search history.

(56) References Cited

U.S. PATENT DOCUMENTS

2010/0228441 A1 9/2010 Watanabe et al.
2015/0203148 A1* 7/2015 Kuramitsu ........... B62D 5/0463
701/41

2017/0369095 A1 12/2017 Kodera et al.
2020/0398889 A1* 12/2020 Higashi ................. B62D 3/126

FOREIGN PATENT DOCUMENTS

| DE | 102010015857 A1 | 12/2010 |
| DE | 102014118639 A1 | 7/2015 |
| EP | 3072782 A1 | 9/2016 |
| JP | 2017-226318 A | 12/2017 |

OTHER PUBLICATIONS

Aug. 20, 2020 Extended Search Report issued in European Patent Application No. 20164266.7.

* cited by examiner

*Primary Examiner* — Jacob D Knutson
(74) *Attorney, Agent, or Firm* — Oliff PLC

(57) ABSTRACT

Provided is a steering system including a controller that controls an electric motor. The controller has a combined friction torque estimation unit that estimates a combined friction torque combining friction torques occurring in respective transmission devices including a first transmission device. The combined friction torque estimation unit has a slipping speed calculation part that calculates a slipping speed of the first transmission device based on an angular speed of the electric motor, a friction coefficient calculation part that calculates a friction coefficient of the first transmission device based on the slipping speed, a tooth flank normal force calculation part that calculates a normal force acting on a tooth flank of the first transmission device, and a friction torque calculation part that calculates the combined friction torque using the friction coefficient, the tooth flank normal force, and one or more preset correction factors.

8 Claims, 10 Drawing Sheets

STEERING SYSTEM

CROSS-REFERENCE TO RELATED APPLICATION

This application claims priority to Japanese Patent Application No. 2019-056999 filed on Mar. 25, 2019, incorporated herein by reference in its entirety.

BACKGROUND

1. Technical Field

The present disclosure relates to a steering system.

2. Description of Related Art

In the fields of controlling an assisting torque in an electric power steering system (EPS) and controlling a reaction force torque in a steer-by-wire system, a technique has been developed that estimates a reaction force from a road surface and a rack axial force using signals from sensors, installed in an EPS and a vehicle, to transmit information on the road surface to a driver and thereby improve the steering performance. For example, Japanese Patent Application Publication No. 2017-226318 (JP 2017-226318 A) discloses a technique of estimating a rack axial force using information (a motor current, a motor angle, and a steering torque) from sensors installed in an EPS and information (a vehicle speed) from a sensor installed in a vehicle.

SUMMARY

The technique described in JP 2017-226318 A has shortcomings: it cannot accurately estimate a friction torque, and therefore has low accuracy in estimating a rack axial force depending on the conditions of a road surface or a tire. The present disclosure provides a steering system that can accurately estimate a friction torque occurring in the steering system.

A steering system according to an aspect of the present disclosure includes: an electric motor; a wheel turning shaft that is moved in an axial direction by a torque of the electric motor so as to turn a wheel-to-be-turned; a plurality of transmission devices; an angular speed detection unit that detects or estimates an angular speed of the electric motor; and a controller that controls the electric motor. One of the transmission devices is a first transmission device that outputs rotation of the electric motor at a reduced speed. The controller has a combined friction torque estimation unit that estimates a combined friction torque combining friction torques occurring in the respective transmission devices. The combined friction torque estimation unit has a slipping speed calculation part that calculates a slipping speed of the first transmission device based on the angular speed, a friction coefficient calculation part that calculates a friction coefficient of the first transmission device based on the slipping speed, a tooth flank normal force calculation part that calculates a normal force acting on a tooth flank of the first transmission device, and a friction torque calculation part that calculates the combined friction torque using the friction coefficient of the first transmission device, the tooth flank normal force of the first transmission device, and one or more preset correction factors.

In this aspect, the combined friction torque is calculated using the tooth flank normal force calculation part that calculates a normal force acting on the tooth flank of the first transmission device, the friction coefficient and the tooth flank normal force of the first transmission device, and the one or more preset correction factors. Thus, a friction torque occurring in the steering system can be accurately estimated. Moreover, calculation of the combined friction torque is simplified compared with when the friction torques occurring in the respective transmission devices are separately calculated using individual meshing models and then the calculated friction torques are combined.

In the above aspect, the friction torque calculation part may be configured to calculate the combined friction torque based on a combined friction coefficient and a combined tooth flank normal force. The combined friction coefficient is a value obtained by multiplying the friction coefficient by a predetermined first correction factor, and the combined tooth flank normal force is a value obtained by multiplying the tooth flank normal force by a predetermined second correction factor. In the above aspect, the friction torque calculation part may be configured to calculate the combined friction torque by calculating a first friction torque occurring in the first transmission device based on the friction coefficient and the tooth flank normal force and then multiplying the obtained first friction torque by a predetermined third correction factor.

In the above aspect, the steering system may further include a steering member and a steering shaft that rotates integrally with the steering member. The first transmission device may be a transmission device that outputs a torque of the electric motor to the steering shaft or the wheel turning shaft. Another of the transmission devices may be a second transmission device that converts rotation of the steering shaft into axial motion of the wheel turning shaft.

In the above configuration, the steering system may further include a torque detection unit that detects a steering torque input from the steering member. The controller may have an axial force estimation unit that estimates an axial force acting on the wheel turning shaft based on the steering torque, the torque of the electric motor, the combined friction torque, and an angle of the electric motor. In the above configuration, the steering system may further include a torque detection unit that detects a steering torque input from the steering member, and an axial force estimation unit that detects or estimates an axial force acting on the wheel turning shaft. The tooth flank normal force calculation part may set a first contact force, calculated based on the torque of the electric motor, the steering torque, and the axial force, as the tooth flank normal force when the first contact force is larger than a predetermined value, and set the predetermined value as the tooth flank normal force when the first contact force is equal to or smaller than the predetermined value.

In the above aspect, the steering system may further include a steering member; a steering shaft that rotates integrally with the steering member; a torque detection unit that detects a steering torque input from the steering member; and an axial force estimation unit that detects or estimates an axial force acting on the wheel turning shaft. The first transmission device may be a transmission device that outputs a torque of the electric motor to the steering shaft or the wheel turning shaft. Another of the transmission devices may be a second transmission device that converts rotation of the steering shaft into axial motion of the wheel turning shaft. The tooth flank normal force calculation part may be configured to calculate a first tooth flank normal force that is a normal force acting on a tooth flank of the first transmission device in a first contact state, based on the torque of the electric motor, the steering torque, and the axial force, and set a second tooth flank normal force that is a normal force acting on the tooth flank of the first transmission device in a second contact state. The friction torque calculation part may be configured to calculate a combined first tooth flank normal force by multiplying the first tooth flank normal force by a predetermined fourth correction factor, calculate a combined second tooth flank normal force by multiplying the second tooth flank normal force by a predetermined fifth correction factor, calculate a combined friction coefficient by multiplying the friction coefficient by a predetermined sixth correction factor, and calculate the combined friction torque based on one of the combined first tooth flank normal force and the combined second tooth flank normal force, whichever has a larger absolute value, and on the combined friction coefficient.

In the above configuration, the tooth flank normal force calculation part may have a first tooth flank normal force correction part that corrects the first tooth flank normal force based on a combined friction torque calculated last time by the friction torque calculation part. The friction torque calculation part may be configured to calculate the combined first tooth flank normal force by multiplying the corrected first tooth flank normal force by the fourth correction factor, calculate the combined second tooth flank normal force by multiplying the second tooth flank normal force by the fifth correction factor, calculate the combined friction coefficient by multiplying the friction coefficient by the sixth correction factor, and calculate the combined friction torque based on one of the combined first tooth flank normal force and the combined second tooth flank normal force, whichever has a larger absolute value, and on the combined friction coefficient.

In the above aspect, one of the transmission devices may be a third transmission device that is disposed on a power transmission path leading from the first transmission device to the wheel turning shaft.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
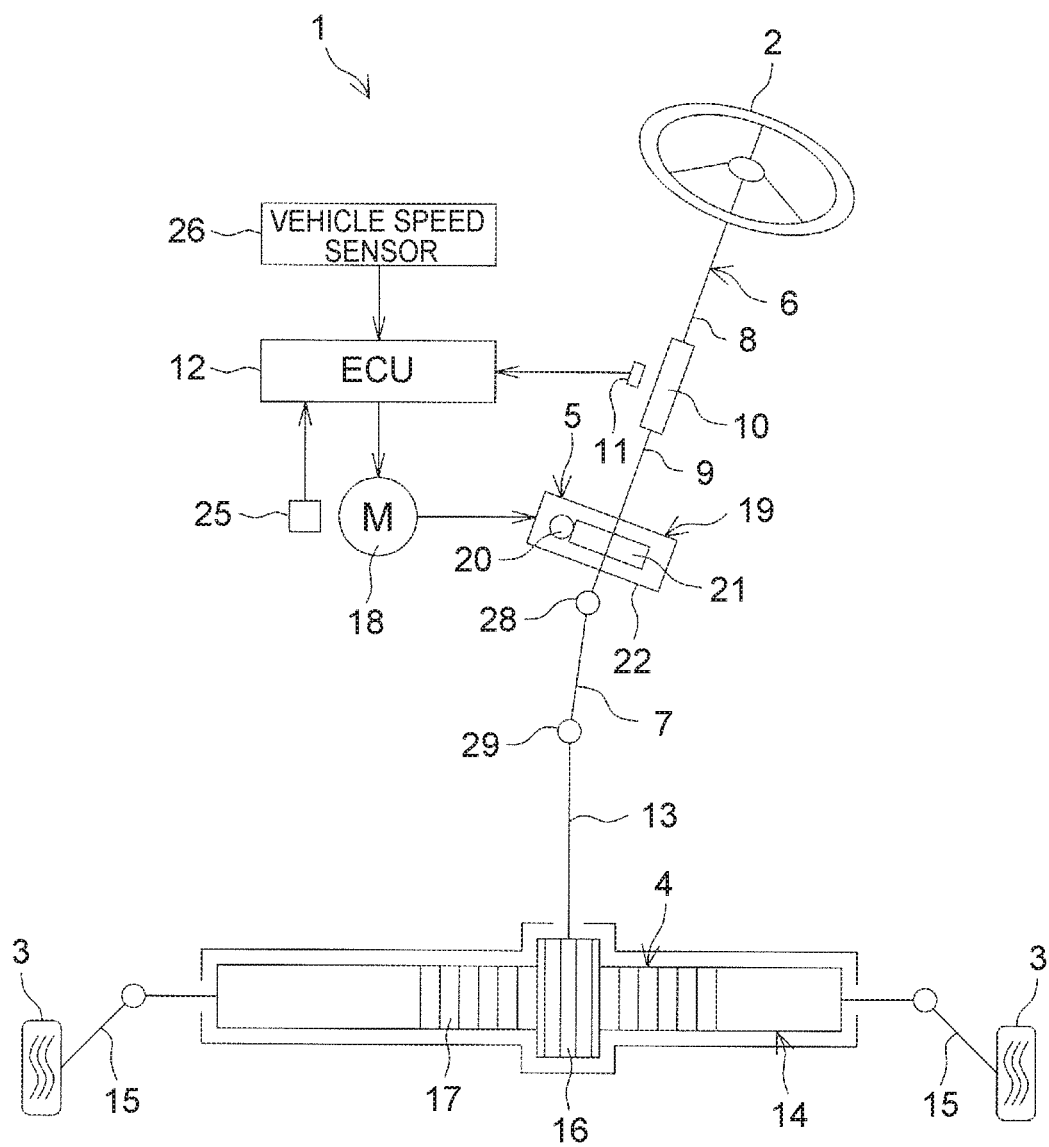
FIG. 1 is a schematic view showing a schematic configuration of an electric power steering system to which a steering system according to an embodiment of the present disclosure is applied.

An embodiment of the present disclosure will be described in detail below with reference to the accompanying drawings. FIG. 1 is a schematic view showing a schematic configuration of an electric power steering system to which a steering system according to an embodiment of the present disclosure is applied. An electric power steering device (steering system) 1 is a column-assist electric power steering system (hereinafter referred to as a "column EPS") in which an electric motor and a speed reducer are disposed on a column part.

The column EPS 1 includes a steering wheel 2 as a steering member used to steer a vehicle, a wheel turning mechanism 4 that turns wheels-to-be-turned 3 in conjunction with rotation of the steering wheel 2, and a steering assisting mechanism 5 that assists a driver in steering. The steering wheel 2 and the wheel turning mechanism 4 are mechanically coupled to each other through a steering shaft 6, a first universal joint 28, an intermediate shaft 7, and a second universal joint 29.

The steering shaft 6 includes a first shaft 8 coupled to the steering wheel 2, and a second shaft 9 coupled to the intermediate shaft 7 through the first universal joint 28. The first shaft 8 and the second shaft 9 are coupled to each other through a torsion bar 10 so as to be able to rotate relatively to each other. A torque sensor 11 is provided around the steering shaft 6. The torque sensor 11 detects a torsion bar torque $T_{tb}$ applied to the torsion bar 10 based on rotation positions of the first shaft 8 and the second shaft 9 relative to each other. The torsion bar torque $T_{tb}$ detected by the torque sensor 11 is input into an electronic control unit (ECU) 12.

The wheel turning mechanism 4 is formed by a rack-and-pinion mechanism including a pinion shaft 13 and a rack shaft 14 as a wheel turning shaft. Each end of the rack shaft 14 is coupled to the wheel-to-be-turned 3 through a tie rod 15 and a knuckle arm (not shown). The pinion shaft 13 is coupled to the intermediate shaft 7 through the second universal joint 29. A pinion 16 is coupled to a leading end of the pinion shaft 13.

The rack shaft 14 extends in a straight line along a left-right direction of the vehicle. A rack 17 meshing with the pinion 16 is formed at a middle portion of the rack shaft 14 in an axial direction. The pinion 16 and the rack 17 constitute a rack-and-pinion mechanism, which converts rotation of the pinion shaft 13 into axial motion of the rack shaft 14. When the steering wheel 2 is operated (rotated), the rotation is transmitted to the pinion shaft 13 through the steering shaft 6 and the intermediate shaft 7. Then, rotation of the pinion shaft 13 is converted into axial motion of the rack shaft 14 by the pinion 16 and the rack 17. The wheels-to-be-turned 3 are turned by this axial motion.

The steering assisting mechanism 5 includes an electric motor 18 that generates a steering assisting force, and a speed reducer 19 that transmits an output torque of the electric motor 18 to the wheel turning mechanism 4 after amplifying the output torque. In this embodiment, the electric motor 18 is a three-phase brushless motor. The speed reducer 19 is formed by a worm gear mechanism including a worm gear 20 and a worm wheel 21 meshing with the worm gear 20. The speed reducer 19 is housed inside a gear housing 22. Hereinafter, a speed reduction ratio (gear ratio) of the speed reducer 19 is represented by $i_{ww}$. The speed reduction ratio $i_{ww}$ is defined as a ratio of a worm gear angle $\theta_{wg}$ that is a rotation angle of the worm gear 20 to a worm wheel angle $\theta_{ww}$ that is a rotation angle of the worm wheel 21 ($\theta_{wg}/\theta_{ww}$).

The worm gear 20 is driven to rotate by the electric motor 18. The worm wheel 21 is coupled to the second shaft 9 so as to be able to rotate integrally with the second shaft 9. The worm wheel 21 is driven to rotate by the worm gear 20. The electric motor 18 is driven according to a steering state of the driver and commands from an external controller, such as an automated driving system, and the worm gear 20 is driven to rotate by the electric motor 18. Thus, the worm wheel 21 is driven to rotate and a motor torque is applied to the steering shaft 6, causing the steering shaft 6 (second shaft 9) to rotate. Then, the rotation of the steering shaft 6 is transmitted to the pinion shaft 13 through the intermediate shaft 7.

Rotation of the pinion shaft 13 is converted into axial motion of the rack shaft 14. The wheels-to-be-turned 3 are turned by this axial motion. Thus, the EPS 1 can provide steering assistance by the electric motor 18 as the worm gear 20 is driven to rotate by the electric motor 18. A rotation angle of a rotor of the electric motor 18 is detected by a rotation angle sensor 25, such as a resolver. A vehicle speed V is detected by a vehicle speed sensor 26. An output signal of the rotation angle sensor 25 and the vehicle speed V detected by the vehicle speed sensor 26 are input into the ECU 12. The electric motor 18 is controlled by the ECU 12.

Figure 2:
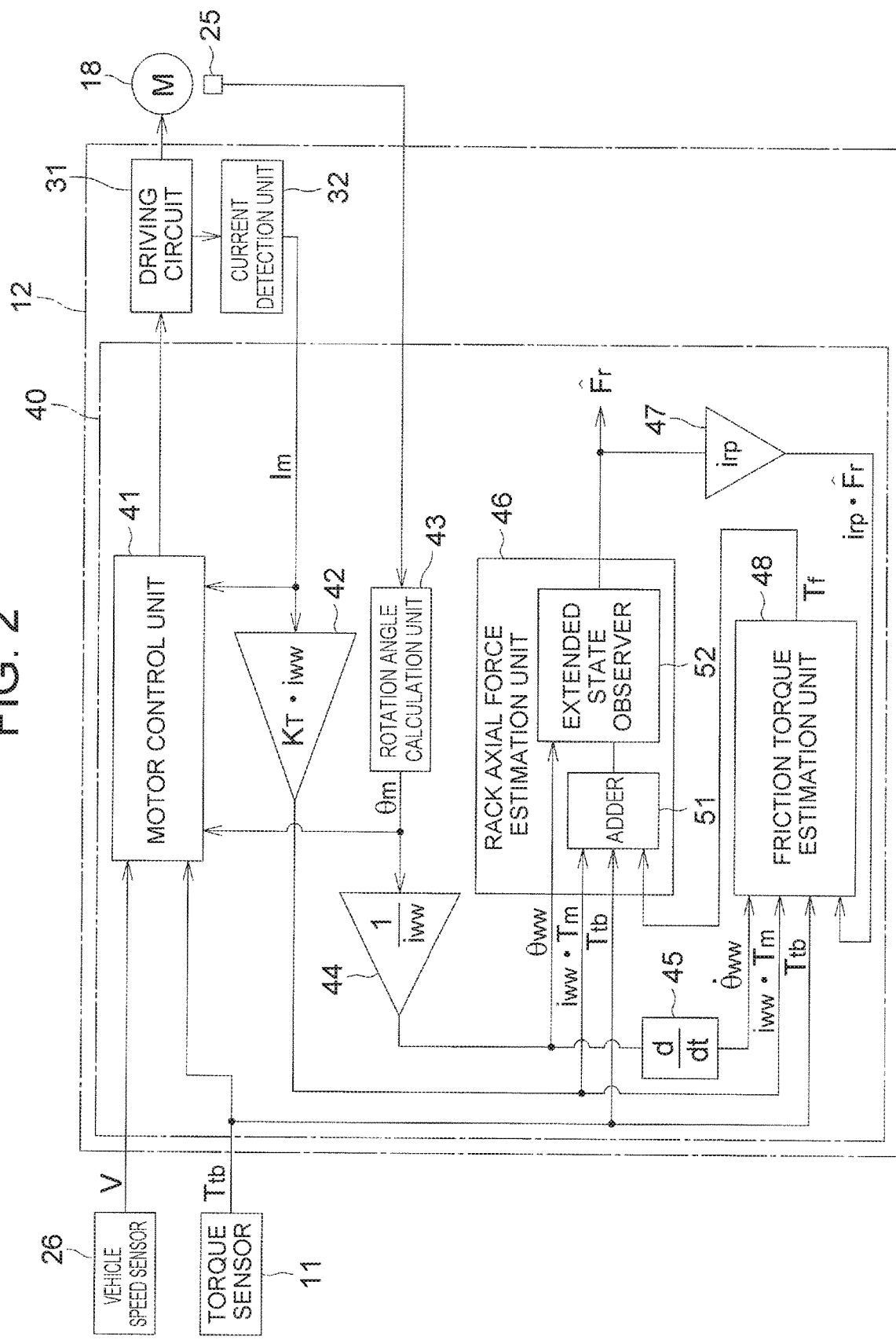
FIG. 2 is a block diagram showing the electrical configuration of an ECU.

FIG. 2 is a block diagram showing the electrical configuration of the ECU 12. The ECU 12 includes a microcomputer 40, a driving circuit (three-phase inverter circuit) 31 that is controlled by the microcomputer 40 and supplies electricity to the electric motor 18, and a current detection unit 32 that detects a current flowing through the electric motor 18 (hereinafter referred to as a "motor current").

The microcomputer 40 includes a CPU and a memory (a ROM, a RAM, a non-volatile memory, or the like), and functions as a plurality of functional processing units by executing predetermined programs. These functional processing units include a motor control unit 41, a first multiplication unit 42, a rotation angle calculation unit 43, a second multiplication unit 44, a differential calculation unit 45, a rack axial force estimation unit 46, a third multiplication unit 47, and a friction torque estimation unit 48.

The first multiplication unit 42 multiplies a motor current $I_m$ detected by the current detection unit 32 by a torque constant $K_T$ of the electric motor 18 and the speed reduction ratio $i_{ww}$ of the speed reducer 19 to calculate a torque (hereinafter referred to as a "driving torque $i_{ww} \cdot T_m$") exerted on the second shaft 9 (worm wheel 21) by a motor torque $T_m (=K_T \cdot I_m)$ of the electric motor 18. The rotation angle calculation unit 43 calculates a rotor rotation angle $\theta_m$ of the electric motor 18 based on an output signal of the rotation angle sensor 25. The second multiplication unit 44 multiplies the rotor rotation angle $\theta_m$ by the reciprocal of the speed reduction ratio $i_{ww}$ of the speed reducer 19 to convert the rotor rotation angle $\theta_m$ into a rotation angle (hereinafter referred to as a "worm wheel angle $\theta_{ww}$") of the second shaft 9 (worm wheel 21). The differential calculation unit 45 differentiates the worm wheel angle $\theta_{ww}$ with respect to time to calculate a worm wheel angular speed $d\theta_{ww}/dt$.

The motor control unit 41 controls driving of the driving circuit 31 based on, for example, the vehicle speed V detected by the vehicle speed sensor 26, the torsion bar torque $T_{tb}$ detected by the torque sensor 11, the motor current $I_m$ detected by the current detection unit 32, and the rotor rotation angle $\theta_m$ calculated by the rotation angle calculation unit 43. Specifically, based on the torsion bar torque $T_{tb}$ and the vehicle speed V, the motor control unit 41 sets a current command value that is a target value of the motor current $I_m$ flowing through the electric motor 18. The current command value corresponds to a target value of a steering assisting force (assisting torque) according to a vehicle state and a steering status. The motor control unit 41 controls driving of the driving circuit 31 such that the motor current detected by the current detection unit 32 approaches the current command value. Thus, appropriate steering assistance according to the vehicle state and the steering status can be provided. The current command value is sometimes set according to a command from an external controller, such as an automated driving system.

The rack axial force estimation unit 46 estimates a rack axial force $F_r$ based on the worm wheel angle $\theta_{ww}$, the driving torque $i_{ww} \cdot T_m$, the torsion bar torque $T_{tb}$, and a friction torque (combined friction torque) $T_f$ estimated by the friction torque estimation unit 48. Hereinafter, an estimated value of the rack axial force $F_r$ will be represented by $\Lambda F_r$. The third multiplication unit 47 multiplies the rack axial force $\Lambda F_r$ by a gear ratio $i_{rp}$ of the rack-and-pinion mechanism 16, 17 to calculate a torque (hereinafter referred to as a "torque-converted rack axial force $i_{rp} \cdot \Lambda F_r$") exerted on the second shaft 9 (worm wheel 21) by the rack axial force $\Lambda F_r$.

The friction torque estimation unit 48 estimates a combined value (combined friction torque) $T_f$ combining a friction torque occurring in the speed reducer 19 and a friction torque occurring in the rack-and-pinion mechanism 16, 17, based on the worm wheel angular speed $d\theta_{ww}/dt$, the driving torque $i_{ww} \cdot T_m$, the torsion bar torque $T_{tb}$, and the torque-converted rack axial force $i_{rp} \cdot \Lambda F_r$ estimated by the rack axial force estimation unit 46.

In the following, the rack axial force estimation unit 46 and the friction torque estimation unit 48 will be described in detail. First, the rack axial force estimation unit 46 will be described. As shown in FIG. 2, the rack axial force estimation unit 46 includes an adder 51 and an extended state observer 52. The adder 51 adds up the driving torque $i_{ww} \cdot T_m$, the torsion bar torque $T_{tb}$, and the friction torque $T_f$ estimated by the friction torque estimation unit 48. Hereinafter, the sum of $i_{ww} \cdot T_m$, $T_{tb}$, and $T_f$ ($i_{ww} \cdot T_m + T_{tb} + T_f$) will be represented by $T_{in}$.

Figure 3:
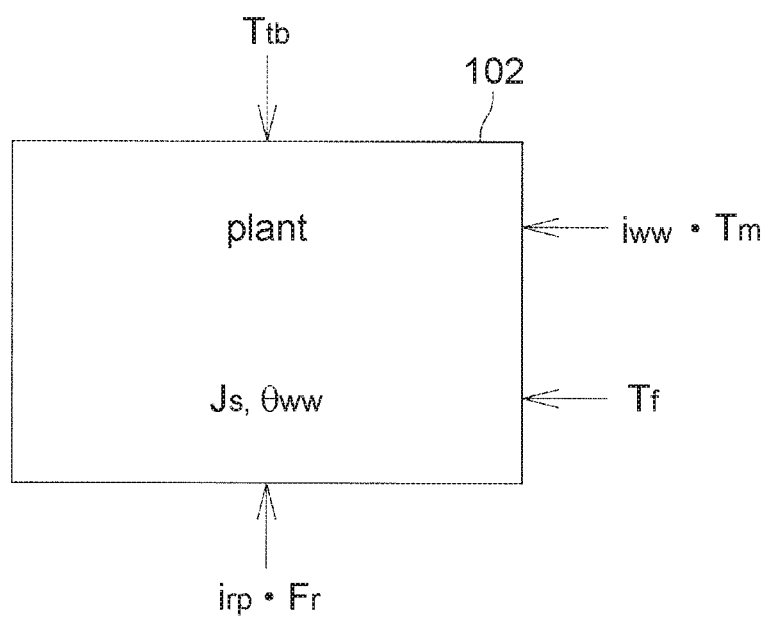
FIG. 3 is a schematic view showing a one-inertia model of the electric power steering system.

The extended state observer 52 estimates the rack axial force $F_r$ etc. based on the worm wheel angle $\theta_{ww}$ and the addition result $T_{in}$ of the adder 51. The extended state observer 52 will be described in detail later. The extended state observer 52 estimates the worm wheel angle $\theta_{ww}$, the worm wheel angular speed $d\theta_{ww}/dt$, the torque-converted rack axial force $i_{rp} \cdot F_r$, and the rack axial force $F_r$, for example, by using a one-inertia model 101 of the electric power steering system 1 shown in FIG. 3. Hereinafter, estimated values of the worm wheel angle $\theta_{ww}$, the worm wheel angular speed $d\theta_{ww}/dt$, the torque-converted rack axial force $i_{rp} \cdot F_r$, and the rack axial force $F_r$ will be represented by $\Lambda\theta_{ww}$, $\cdot \Lambda d\theta_{ww}/dt$, $i_{rp} \cdot \Lambda F_r$, and $\Lambda F_r$, respectively.

The one-inertia model 101 is an inertia model of a plant 102 that assumes coupling portions to be rigid bodies, and that totals inertias of the second shaft 9 and the worm wheel 21, an inertia of the rotor of the electric motor 18, an inertia of the worm gear 20, an inertia of an intermediate shaft (the first and second universal joints 28, 29 and the intermediate shaft 7), an inertia of the pinion shaft 13, and a mass of the rack shaft 14 (converted into an inertia of the pinion shaft 13). The torsion bar torque $T_{tb}$ is applied from the steering wheel 2 to the plant 102 through the torsion bar 10, and the torque-converted rack axial force $i_{rp} \cdot F_r$ is applied from the wheels-to-be-turned 3 to the plant 102.

The driving torque $i_{ww} \cdot T_m$ is also applied to the plant 102 through the worm gear 20. Moreover, the combined torque (combined friction torque) $T_f$ combining the friction torque occurring in the speed reducer 19 and the friction torque occurring in the rack-and-pinion mechanism 16, 17 is applied to the plant 102. When an inertia of the plant 102 is $J_s$, an equation of motion of the one-inertia model 101 is expressed by the following Expression (1):

$$J_s \ddot{\theta}_{ww} = I_{ww} T_m + T_{tb} + T_f + I_{rp} F_r \qquad (1)$$

Since $i_{ww} \cdot T_m + T_{tb} + T_f = T_{in}$, an expression for obtaining the torque-converted value $i_{rp} \cdot F_r$ of the rack axial force $F_r$ is the following Expression (2):

$$i_{rp} F_r = J_s \ddot{\theta}_{ww} - T_{in} \qquad (2)$$

A state space model of the extended state observer is expressed by the following Expression (3):

$$\begin{cases} \dot{x}_e = A_e x_e + B_e u_1 \\ y = C_{e1} x_e + D_e u_1 \end{cases} \qquad (3)$$

In Expression (3), $x_e$ is a state variable vector, $u_1$ is a known input vector, y is an output vector (measured value), $A_e$ is a system matrix, $B_e$ is an input matrix, $C_{e1}$ is a first output matrix, and $D_e$ is a feedthrough matrix. $x_e$, $u_1$, and y are expressed by the following Expression (4):

$$x_e = \begin{bmatrix} \theta ww \\ \dot{\theta} ww \\ i_{rp} Fr \end{bmatrix} \cdot u_1 = T_{in} \cdot y = \theta ww \qquad (4)$$

$A_e$, $B_e$, $C_{e1}$, and $D_e$ are expressed by the following Expression (5):

$$A_e = \begin{bmatrix} 0 & 1 & 0 \\ 0 & 0 & \frac{1}{J_e} \\ 0 & 0 & 0 \end{bmatrix},$$

$$B_e = \begin{bmatrix} 0 \\ \frac{1}{J_e} \\ 0 \end{bmatrix},$$

$$C_{e1} = [1 \ 0 \ 0],$$

$$D_e = 0$$

By applying a Luenberger state observer to an extended state model, it is possible to estimate the torque-converted rack axial force $i_{rp} \cdot F_r$ (rack axial force $F_r$) as in a common state observer. An observer model is shown as the following Expression (6):

$$\begin{cases} \dot{\hat{x}}_e = A_e \hat{x}_e + B_e u_1 + L(y - \hat{y}) \\ \hat{y} = C_{e1} \hat{x}_e + D_e u_1 \end{cases} \qquad (6)$$

In Expression (6), $\Lambda x_e$ represents an estimated value of $x_e$. L is an observer gain matrix. $\Lambda y$ represents an estimated value of y. The observer gain matrix L is expressed by the following Expression (7):

$$L = \begin{bmatrix} L_1 \\ L_2 \\ L_3 \end{bmatrix} = \begin{bmatrix} -3\omega \\ 3\omega^2 \\ -J\omega^3 \end{bmatrix} \qquad (7)$$

In Expression (7), $L_1$, $L_2$, and $L_3$ are first, second, and third observer gains, respectively, and ω [rad/sec] is a pole frequency. The pole frequency ω is set according to a load to be compensated for by the observer. The rack axial force $F_r$ (estimated value) is expressed by the following Expression (8) using the state variable vector $\Lambda x_e$:

$$F_r = C_{e2} \hat{x}_e \qquad (8)$$

In Expression (8), $C_{e2}$ is a second output matrix and expressed by the following Expression (9):

$$C_{e2} = \begin{bmatrix} 0 & 0 & \frac{1}{i_{rp}} \end{bmatrix} \qquad (9)$$

Figure 4:
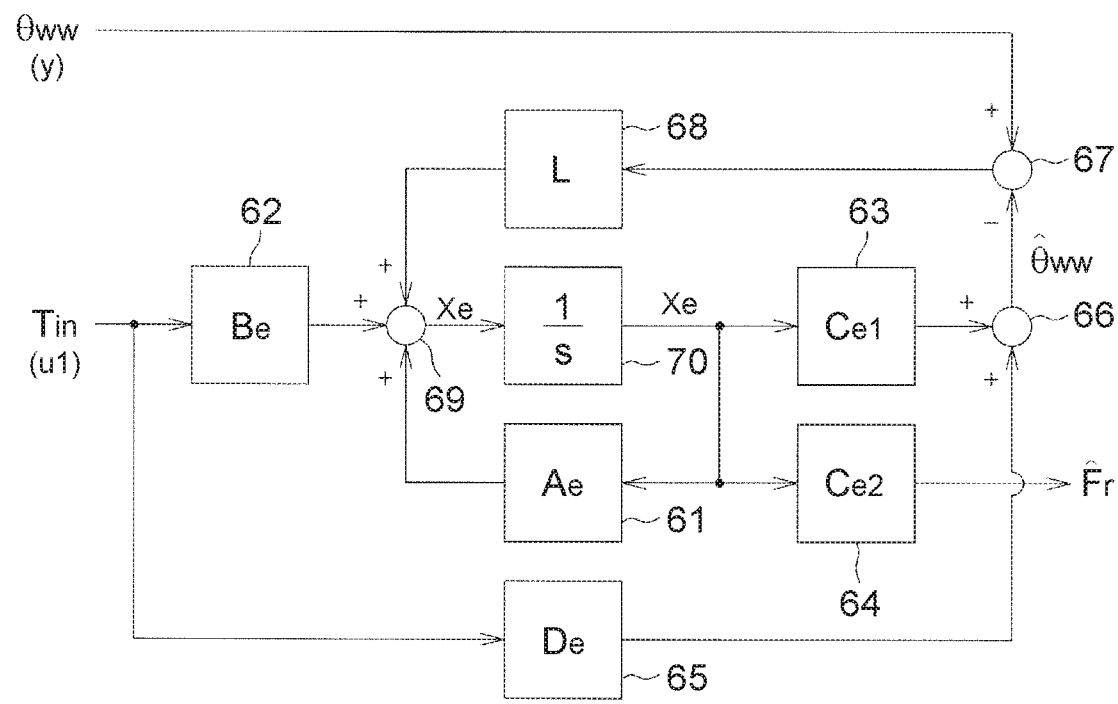
FIG. 4 is a block diagram showing the configuration of an extended state observer.

FIG. 4 is a block diagram showing the configuration of the extended state observer 52. The extended state observer 52 includes an $A_e$ multiplication part 61, a $B_e$ multiplication part 62, a $C_{e1}$ multiplication part 63, a $C_{e2}$ multiplication part 64, a $D_e$ multiplication part 65, a first addition part 66, a second addition part 67, an L-multiplication part 68, a third addition part 69, and an integration part 70. The addition result $T_{in}$ ($=i_{ww} \cdot T_m + T_{tb} + T_f$) of the adder 51 of FIG. 2 corresponds to the input vector $u_1$ of Expression (6) and is given to the $B_e$ multiplication part 62 and the $D_e$ multiplication part 65. The worm wheel angle $\theta_{ww}$ calculated by the second multiplication unit 44 of FIG. 2 corresponds to the output vector (measured value) y of Expression (6) and is given to the second addition part 67.

A calculation result of the integration part 70 is the estimated worm wheel angle $\Lambda \theta_{ww}$, the estimated worm wheel angular speed $\Lambda d\theta_{ww}/dt$, and the estimated torque-converted rack axial force $i_{rp} \cdot \Lambda F_r$ that are included in the estimated value $\Lambda x_e$ of the state variable vector $x_e$. At the start of calculation, initial values of these estimated values $\Lambda \theta_{ww}$, $\Lambda d\theta_{ww}/dt$, and $i_{rp} \cdot \Lambda F_r$ are zero, for example. The $C_{e1}$ multiplication part 63 multiplies $\Lambda x_e$ calculated by the integration part 70 by $C_{e1}$ to calculate $C_{e1} \cdot \Lambda x_e$ of Expression (6). In this embodiment, $C_{e1} \cdot \Lambda x_e$ is the estimated worm wheel angle $\Lambda \theta_{ww}$.

The $C_{e2}$ multiplication part 64 multiplies $\Lambda x_e$ calculated by the integration part 70 by $C_{e2}$ to calculate $C_{e2} \cdot \Lambda x_e$ of Expression (8). In this embodiment, $C_{e2} \cdot \Lambda x_e$ is the estimated rack axial force $\Lambda F_r$, and this estimated rack axial force $\Lambda F_r$ is an output of the extended state observer 52. The $A_e$ multiplication part 61 multiplies $\Lambda x_e$ calculated by the integration part 70 by $A_e$ to calculate $A_e \cdot \Lambda x_e$ of Expression (6). The $B_e$ multiplication part 62 multiplies $T_{in}$ by $B_e$ to calculate $B_e \cdot u_1$ of Expression (6). The $D_e$ multiplication part 65 multiplies $T_{in}$ by $D_e$ to calculate $D_e \cdot u_1$ of Expression (6).

The first addition part 66 adds $D_e \cdot u_1$ calculated by the $D_e$ multiplication part 65 to $C_{e1} \cdot \Lambda x_e$ ($=\Lambda \theta_{ww}$) calculated by the $C_{e1}$ multiplication part 63 to calculate the estimated output vector $\Lambda y$ of Expression (6). In this embodiment, $D_e=0$ and therefore $\Lambda y = \Lambda \theta_{ww}$. The second addition part 67 subtracts the estimated output vector $\Lambda y$ calculated by the first addition part 66 from the measured output vector y ($=\theta_{ww}$) to calculate the difference (y−$\Lambda y$).

The L-multiplication part 68 multiplies the calculation result (y−$\Lambda y$) of the second addition part 63 by the observer gain L to calculate L (y−$\Lambda y$) of Expression (6). The third addition part 69 adds up the calculation result $A_e \cdot \Lambda x_e$ of the $A_e$ multiplication part 61, the calculation result $B_e \cdot u_1$ of the $B_e$ multiplication part 62, and the calculation result L (y−$\Lambda y$) of the L-multiplication part 68 to calculate $d\Lambda x_e/dt$ of Expression (6). The integration part 70 integrates $d\Lambda x_e/dt$ to calculate $\Lambda x_e$ of Expression (6).

In the following, the friction torque estimation unit 48 will be described in detail. First, the basic concept of the friction torque estimation unit 48 will be described. As will be described later, a meshing friction torque (hereinafter referred to as a first friction torque $T_{fW\&W}$) of the worm wheel 21 and the worm gear 20 can be estimated by using a meshing model of the worm wheel and the worm gear and a friction coefficient estimation model (a LuGre model etc.). Similarly, a meshing friction torque (hereinafter referred to as a second friction torque $T_{fR\&P}$) of the rack 17 and the pinion 16 can be estimated by using a meshing model of the rack and the pinon and a friction coefficient estimation model.

Figure 5:
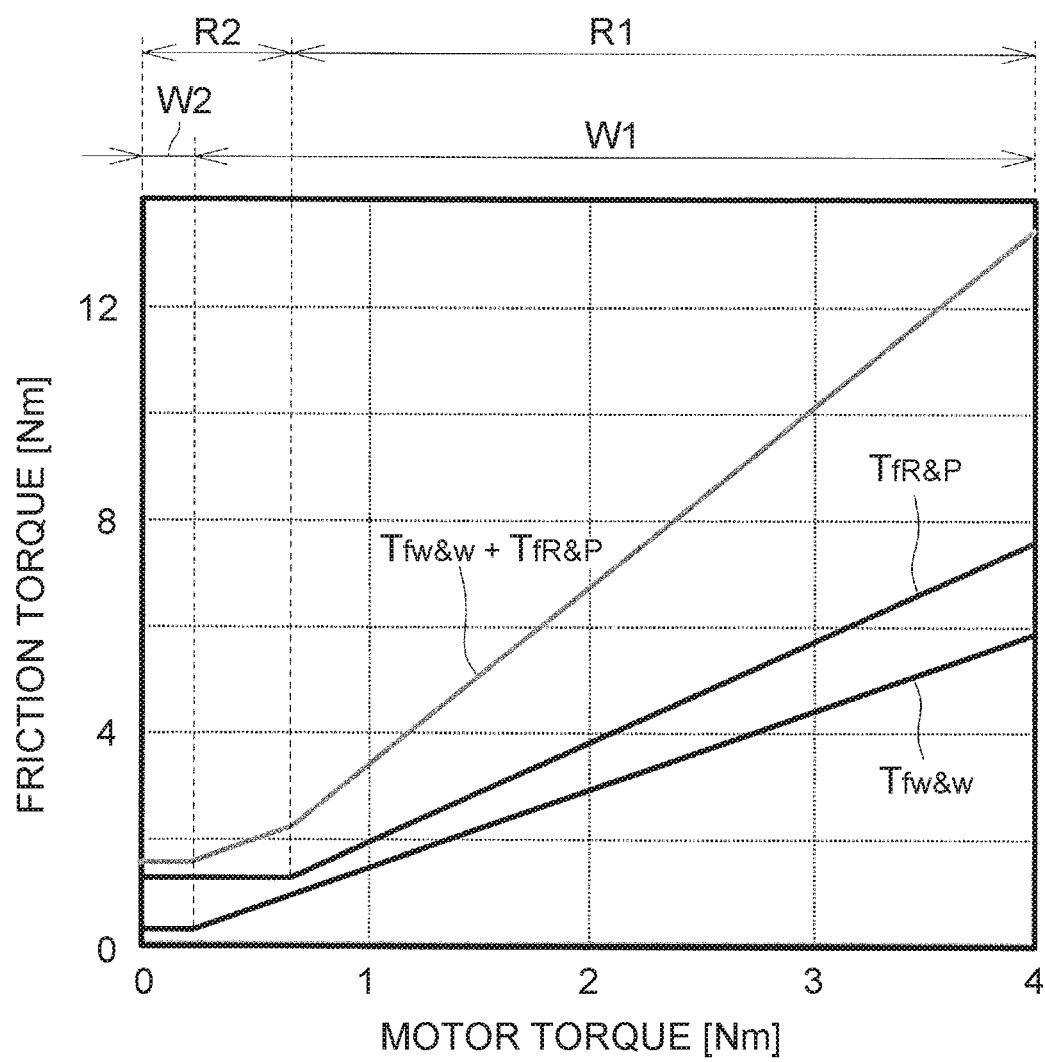
FIG. 5 is a graph illustrating that there is a correlation between a meshing friction torque of a worm wheel and a worm gear and a meshing friction torque of a rack and a pinion.

The first friction torque $T_{fW\&W}$ and the second friction torque $T_{fR\&P}$ thus estimated and a combined friction torque $T_{fW\&W}+T_{fR\&P}$ combining these friction torques can be graphically shown as FIG. 5, with a motor torque plotted as abscissas and a friction torque as ordinates. In FIG. 5, W1 indicates a range of the first friction torque $T_{fW\&W}$ in a first contact state; W2 indicates a range of the first friction torque $T_{fW\&W}$ in a second contact state; R1 indicates a range of the second friction torque $T_{fR\&P}$ in the first contact state; and R2 indicates a range of the second friction torque $T_{fR\&P}$ in the second contact state.

It can be seen from FIG. 5 that there is a correlation between the first friction torque $T_{fW\&R}$ in the first contact state and the second friction torque $T_{fR\&P}$ in the first contact state, and that there is also a correlation between the first friction torque $T_{fW\&W}$ in the second contact state and the second friction torque $T_{fR\&P}$ in the second contact state. Therefore, it can be seen that there is also a correlation between the first friction torque $T_{fW\&W}$ and the combined friction torque $T_{fW\&W}+T_{fR\&P}$.

By using this correlation, the friction torque estimation unit 48 estimates the first friction torque $T_{fW\&W}$ and then estimates the combined friction torque $T_f$ combining the first friction torque $T_{fW\&W}$ and the second friction torque $T_{fR\&P}$ from the estimated first friction torque $T_{fW\&W}$. Alternatively, the friction torque estimation unit 48 estimates a plurality of calculation elements for calculating the first friction torque $T_{fW\&W}$, and estimates a plurality of combined calculation elements for calculating the combined friction torque $T_f$ from the estimated calculation elements of first friction torque $T_{fW\&W}$, and then estimates the combined friction torque $T_f$ using the estimated combined calculation elements.

In this embodiment, the friction torque estimation unit 48 uses the meshing model of the worm wheel and the worm gear to calculate a combined tooth flank normal force $F_{N1com}$ (an example of the "combined first tooth flank normal force" of the claims) in a one-point contact state of the worm wheel 21 and the worm gear 20 by multiplying a tooth flank normal force $F_{N1}$ (an example of the "first tooth flank normal force" of the claims) in the one-point contact state by a predetermined one-point-contact correction factor (an example of the "fourth correction factor" of the claims).

Moreover, the friction torque estimation unit 48 calculates a combined tooth flank normal force $F_{N2com}$ (an example of the "combined second tooth flank normal force" of the claims) in a two-point contact state of the worm wheel 21 and the worm gear 20 by multiplying a tooth flank normal force $F_{N2}$ (an example of the "second tooth flank normal force" of the claims) in the two-point contact state by a predetermined two-point-contact correction factor (an example of the "fifth correction factor" of the claims). Then, the friction torque estimation unit 48 calculates, as a combined tooth flank normal force $F_{Ncom}$, one of the combined tooth flank normal force $F_{FN1com}$ in the one-point contact state and the combined tooth flank normal force $F_{N2com}$ in the two-point contact state, whichever has a larger absolute value.

Further, the friction torque estimation unit 48 calculates a slipping speed $v_s$ of the worm wheel 21 and the worm gear 20, and calculates a friction coefficient $\mu_{W\&W}$ of the worm wheel 21 and the worm gear 20 by using the obtained slipping speed $v_s$. Then, the friction torque estimation unit 48 multiplies the friction coefficient $\mu_{W\&W}$ by a predetermined friction coefficient correction factor (an example of the "first correction factor" or the "sixth correction factor" of the claims) to calculate a combined friction coefficient $\mu_{com}$. Then, the friction torque estimation unit 48 calculates the combined friction torque $T_f$ by using the combined tooth flank normal force $F_{Ncom}$ and the combined friction coefficient $\mu_{com}$.

Figure 6:
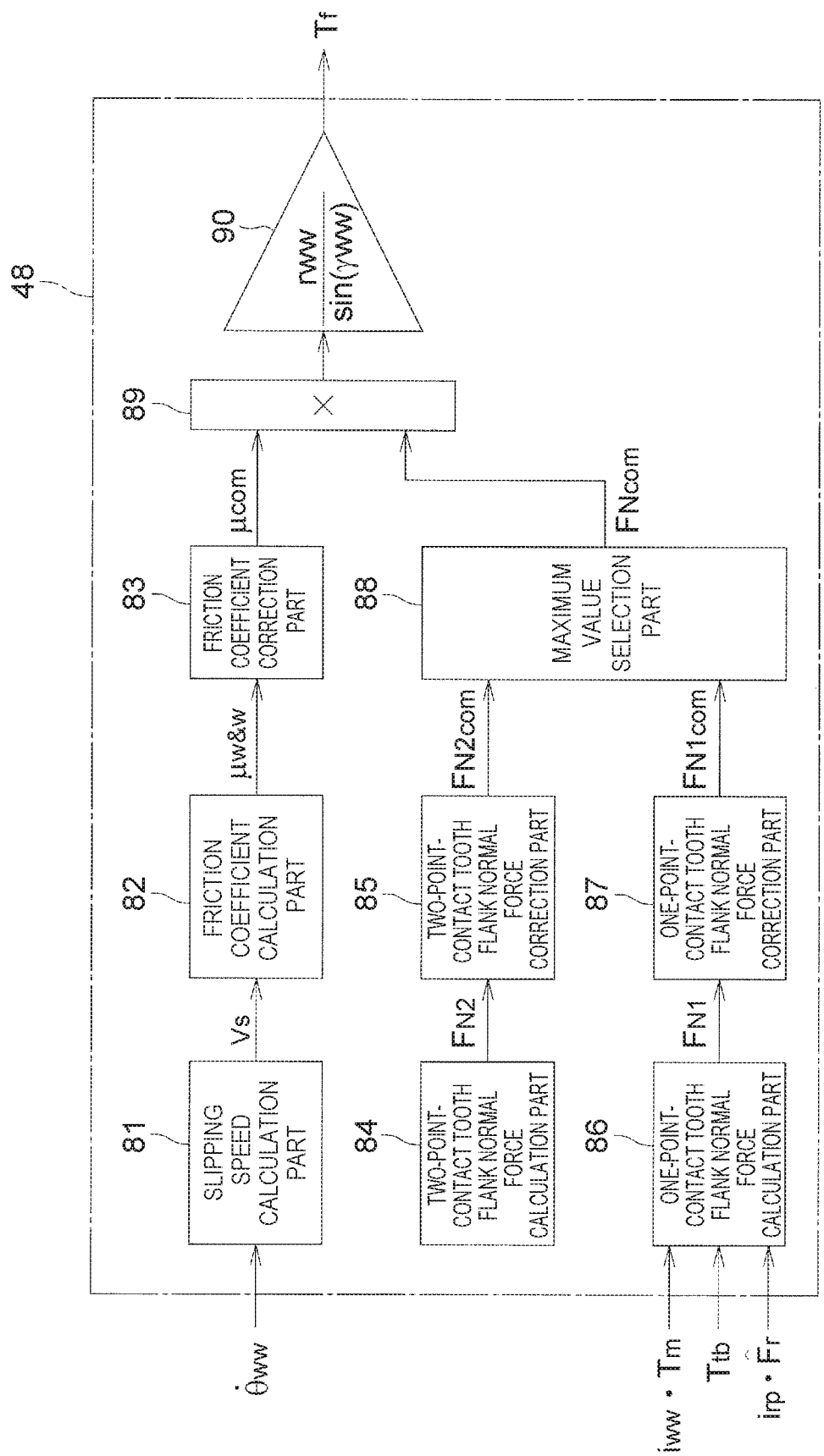
FIG. 6 is a block diagram showing the configuration of a friction torque estimation unit.

FIG. 6 is a block diagram showing the configuration of the friction torque estimation unit 48. The friction torque estimation unit 48 includes a slipping speed calculation part 81, a friction coefficient calculation part 82, a friction coefficient correction part 83, a two-point-contact tooth flank normal force calculation part 84, a two-point-contact tooth flank normal force correction part 85, a one-point-contact tooth flank normal force calculation part 86, a one-point-contact tooth flank normal force correction part 87, a maximum value selection part 88, a multiplication part 89, and a multiplication part 90.

First, the two-point-contact tooth flank normal force calculation part 84, the two-point-contact tooth flank normal force correction part 85, the one-point-contact tooth flank normal force calculation part 86, the one-point-contact tooth flank normal force correction part 87, and the maximum value selection part 88 will be described. The two-point-contact tooth flank normal force calculation part 84 and the one-point-contact tooth flank normal force calculation part 86 set a normal force acting on a tooth flank in a two-point contact state and that in a one-point contact state, respectively, by using the meshing model of the worm wheel and the worm gear.

Figure 7:
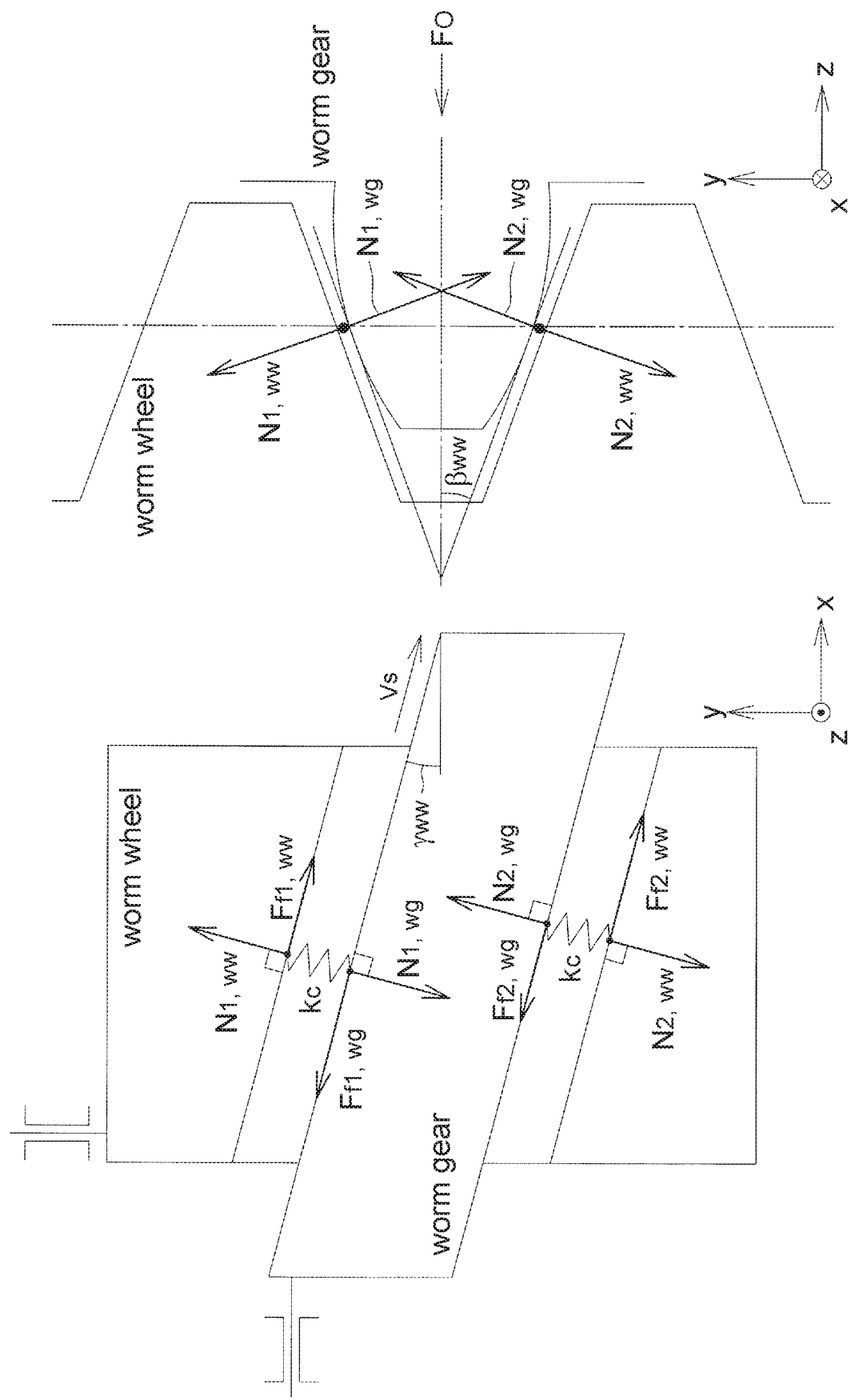
FIG. 7 is a schematic view showing a meshing model of the worm wheel and the worm gear.

FIG. 7 is a schematic view showing the meshing model of the worm wheel and the worm gear. In FIG. 7, the suffixes ww and wg indicate the worm wheel and the worm gear, respectively. The x-axis and the y-axis are tangents to meshing points on a pitch circle of the worm gear and the worm wheel. The z-axis is a direction along a radial direction common to these gears. Rotation of the worm wheel corresponds to motion in a y-direction, and rotation of the worm gear corresponds to motion in an x-direction. It is assumed that a pressure angle $B_{ww}$ of the worm wheel remains constant. It is also assumed that a friction torque on the tooth flank acts in the direction of a lead angle $\gamma_{ww}$ of the worm wheel.

When the system is stationary, teeth of the worm gear meshing with the worm wheel are in contact with the worm wheel at two upper and lower points due to a preload $F_0$. This state will be referred to as a two-point contact state. Interacting forces $F_{c,\ ww}$, $F_{c,\ wg}$ between the worm wheel and the worm gear are composed of a tooth flank normal force $N_{i,\ xx}$ (xx=ww, wg) and a friction torque $F_{i,\ xx}$ that occur at two contact points i=1, 2. The tooth flank normal force $N_{i,\ xx}$ results from material strain represented by a spring with a modulus $k_c$.

When the amount of compression of an upper spring or a lower spring becomes zero, the contact point is lost. A state where one of the two contact points is lost is referred to as a one-point contact state. The friction torque $T_{fw\&w}$ on the gear tooth flank is represented by the following Expression (10):

$$T_{fw\&w} = \frac{r_{ww}}{\sin(\gamma_{ww})} \mu_{w\&w} F_N \quad (10)$$

In Expression (10), $\mu_{W\&W}$ is a friction coefficient, $r_{ww}$ is the radius of the worm gear, and $F_N$ is a tooth flank normal force. In the following, a calculation method of the tooth flank normal force $F_N$ will be described. The following Expression (11) expresses a tooth flank contact force $F_c$ that is a force of contact between teeth without taking into account the preload $F_0$:

$$F_c = \frac{J_{ww} i_{ww} T_m - i_{ww}^2 (J_{wg} + J_m)(T_{ww})}{r_{ww} \cos(\gamma_{ww}) \cos(\beta_{ww}) J_c} \quad (11)$$

In Expression (11), $J_{ww}$ is an inertia of the worm wheel, $J_{wg}$ is an inertia of the worm gear, $J_m$ is an inertia of the motor, and $J_c$ is a total of these inertias converted into an inertia on an axis of the column. $T_m$ is a motor torque, $T_{ww}$ is an external torque acting on the second shaft 9, and $i_{ww}$ is the gear ratio of the speed reducer 19. The external torque $T_{ww}$ is the sum of the torsion bar torque $T_{tb}$ and the torque-converted rack axial force $i_{rp} \cdot \Delta F_r$ ($T_{tb} + i_{rp} \cdot \Delta F_r$). $i_{rp}$ is the gear ratio of the rack-and-pinion mechanism 16, 17.

When the contact state is the two-point contact state, the tooth flank contact force $F_c$ is equal to or smaller than a predetermined value $F_0/\sin(\beta_{ww})$ ($F_c \leq F_0/\sin(\beta_{ww})$). In this case, the tooth flank normal force $F_N$ is set based on the following Expression (12a). On the other hand, when the contact state is the one-point contact state, the tooth flank contact force $F_c$ is larger than the predetermined value $F_0/\sin(\beta_{ww})$ ($F_c > F_0/\sin(\beta_{ww})$). In this case, the tooth flank normal force $F_N$ is set based on the following Expression (12b):

$$\text{if } F_c \leq \frac{F_0}{\sin(\beta_{ww})}, F_N = \frac{F_0}{\sin(\beta_{ww})} \quad (12a)$$

$$\text{if } F_c > \frac{F_0}{\sin(\beta_{ww})}, F_N = F_c \quad (12b)$$

It is known that when the contact state is the two-point contact state, the absolute value of the tooth flank normal force $F_N$ calculated based on Expression (12a) is larger than the absolute value of the tooth flank normal force $F_N$ calculated based on Expression (12b), and that, conversely, when the contact state is the one-point contact state, the latter is larger than the former. Therefore, one of the tooth flank normal force $F_N$ calculated based on Expression (12a) and the tooth flank normal force $F_N$ calculated by Expression (12b), whichever has a larger absolute value, is the tooth flank normal force $F_N$.

Referring back to FIG. 6, the two-point-contact tooth flank normal force calculation part 84 sets the tooth flank normal force $F_N$ expressed by Expression (12a) as the tooth flank normal force $F_{N2}$ in the two-point contact state. The two-point-contact tooth flank normal force correction part 85 multiplies the tooth flank normal force $F_{N2}$ set by the two-point-contact tooth flank normal force calculation part 84 by the two-point-contact correction factor to calculate the combined tooth flank normal force $F_{N2com}$ in the two-point contact state.

The one-point-contact tooth flank normal force calculation part 86 sets the tooth flank normal force $F_N$ expressed by Expression (12b) as the tooth flank normal force $F_{N1}$ in the one-point contact state. The one-point-contact tooth flank normal force correction part 87 multiplies the tooth flank normal force $F_{N1}$ set by the one-point-contact tooth flank normal force calculation part 86 by the one-point-contact correction factor to calculate the combined tooth flank normal force $F_{N1com}$ in the one-point contact state.

The maximum value selection part 88 selects, as the final combined tooth flank normal force $F_{Ncom}$, one of the combined tooth flank normal force $F_{N1com}$ in the first contact state and the combined tooth flank normal force $F_{N2com}$ in the second contact state, whichever has a larger absolute value, and gives the selected one to the multiplication part 89. Next, the slipping speed calculation part 81, the friction coefficient calculation part 82, and the friction coefficient correction part 83 will be described. The slipping speed calculation part 81 and the friction coefficient calculation part 82 estimate the friction coefficient $\mu_{W\&W}$ of meshing parts of the worm wheel and the worm gear by using the LuGre model. Calculation of the friction coefficient $\mu_{W\&W}$ by the LuGre model is expressed by the following Expression (13) using a slipping speed $v_s$ of two objects and a deflection state variable p of a brush:

$$\mu_{w\&w} = \sigma_0 p + \sigma_1 \dot{p} + \sigma_2 v_s \quad (13)$$

$$\dot{p} = v_s - \sigma_0 \frac{|v_s|}{g(v_s)} p$$

$$g(v_s) = \mu_0 + (\mu_{ba} - \mu_c) e^{-\left(\frac{v_s}{v_{stb}}\right)^2}$$

Here, $\mu_c$ is the Coulomb friction coefficient. $\mu_{ba}$ is a static friction coefficient. $v_{stb}$ is the Stribeck speed coefficient. $\sigma_0$ is a rigidity coefficient of the brush. $\sigma_1$ is a damping coefficient of the brush. $\sigma_2$ is a viscous friction coefficient. These six parameters are obtained through experiment. The slipping speed $v_s$ that is an input for the LuGre model is calculated based on the following Expression (14):

$$v_s = \frac{r_{ww} \dot{\theta}_{ww}}{\sin(\gamma_{ww})} \quad (14)$$

The slipping speed calculation part 81 calculates the slipping speed $v_s$ based on Expression (14). Alternatively, the estimated worm wheel angular speed $\Delta d\theta_{ww}/dt$ calculated by the extended state observer 52 may be used as the worm wheel angular speed $d\theta_{ww}/dt$ of Expression (14). In this case, the differential calculation unit 45 of FIG. 2 can be omitted. The friction coefficient calculation part 82 calculates the friction coefficient $\mu_{W\&W}$ based on Expression (13) by using the slipping speed $v_s$ calculated by the slipping speed calculation part 81. The friction coefficient correction part 83 multiplies the friction coefficient $\mu_{W\&W}$ by a predetermined friction coefficient correction factor to calculate a combined friction coefficient $\mu_{com}$. The combined friction coefficient $\mu_{com}$ calculated by the friction coefficient correction part 83 is given to the multiplication part 89.

The multiplication part 89 multiplies the combined tooth flank normal force $F_{Ncom}$ by the combined friction coefficient $\mu_{com}$. The multiplication part 90 multiplies the combined friction force $\mu_{com} \cdot F_{Ncom}$ that is a multiplication result of the multiplication part 89 by $r_{ww}/\sin(\gamma_{ww})$ to calculate the combined friction torque $T_f$. In this embodiment, the sum of the fist friction torque $T_{fW\&W}$ occurring in the speed reducer 19 and the second friction torque $T_{fR\&P}$ occurring in the rack-and-pinion mechanism 16, 17 is estimated by the friction torque estimation unit 48, so that a friction torque occurring in the electric power steering system 1 can be accurately estimated.

In this embodiment, the combined friction torque $T_f$ that is the sum of the first friction torque $T_{fW\&W}$ and the second friction torque $T_{fR\&P}$ is calculated based on the friction coefficient $\mu_{W\&W}$ of the speed reducer 19, the tooth flank normal force $F_{N2}$ in the two-point contact state, the tooth flank normal force $F_{N1}$ in the one-point contact state, the preset friction coefficient correction factor, the two-point-contact correction factor, and the one-point-contact correction factor. Thus, calculation of the combined friction torque $T_f$ is simplified compared with when the first friction torque $T_{fW\&W}$ and the second friction torque $T_{fR\&P}$ are separately calculated using individual meshing models and then the calculated friction torques are combined.

In this embodiment, one of the value obtained by multiplying the tooth flank normal force $F_{N2}$ in the two-point contact state by the two-point-contact correction factor and the value obtained by multiplying the tooth flank normal force $F_{N1}$ in the one-point contact state by the one-point-contact correction factor, whichever has a larger absolute value, is calculated as the combined tooth flank normal force $F_{Ncom}$. Alternatively, one of the tooth flank normal force $F_{N2}$ in the two-point contact state and the tooth flank normal force $F_{N1}$ in the one-point contact state, whichever has a larger absolute value, may be calculated as the tooth flank normal force $F_N$ of the speed reducer 19, and the obtained tooth flank normal force $F_N$ of the speed reducer 19 may be multiplied by a predetermined normal force correction factor (an example of the "second correction factor" of the claims) to calculate the combined tooth flank normal force $F_{Ncom}$.

One of the tooth flank normal force $F_{N2}$ in the two-point contact state and the tooth flank normal force $F_{N1}$ in the one-point contact state, whichever has a larger absolute value, may be calculated as the tooth flank normal force $F_N$ of the speed reducer 19, and the obtained tooth flank normal force $F_N$ of the speed reducer 19 may be multiplied by the friction coefficient $\mu_{W\&W}$ of the speed reducer 19, and this multiplication result $\mu_{W\&W} \cdot F_N$ may be multiplied by a predetermined friction torque correction factor (an example of the "third correction factor" of the claims) to calculate the combined friction torque $T_f$.

Figure 8:
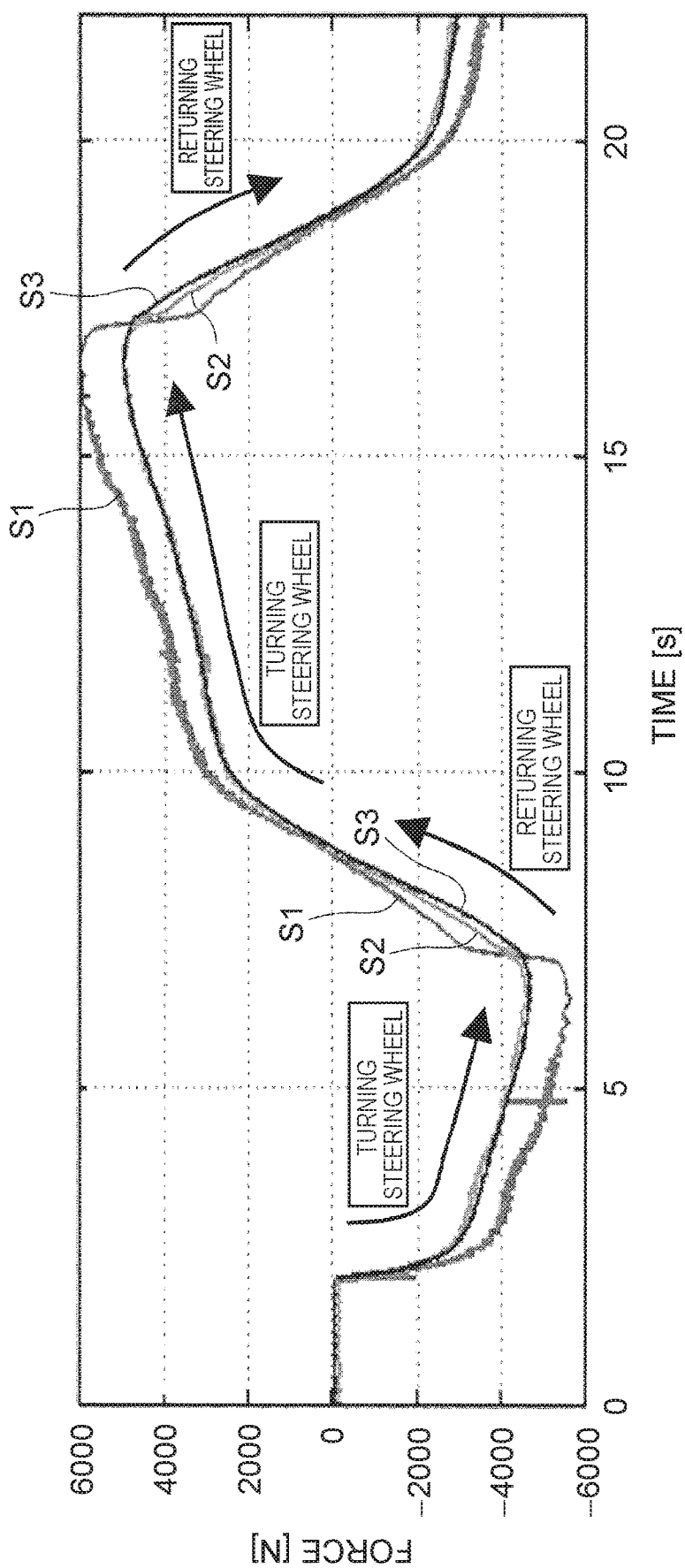
FIG. 8 is a graph showing changes that occur in an estimated rack axial force $\Delta F_r$ etc. over time when a steering wheel is repeatedly turned and returned.
Figure 9:
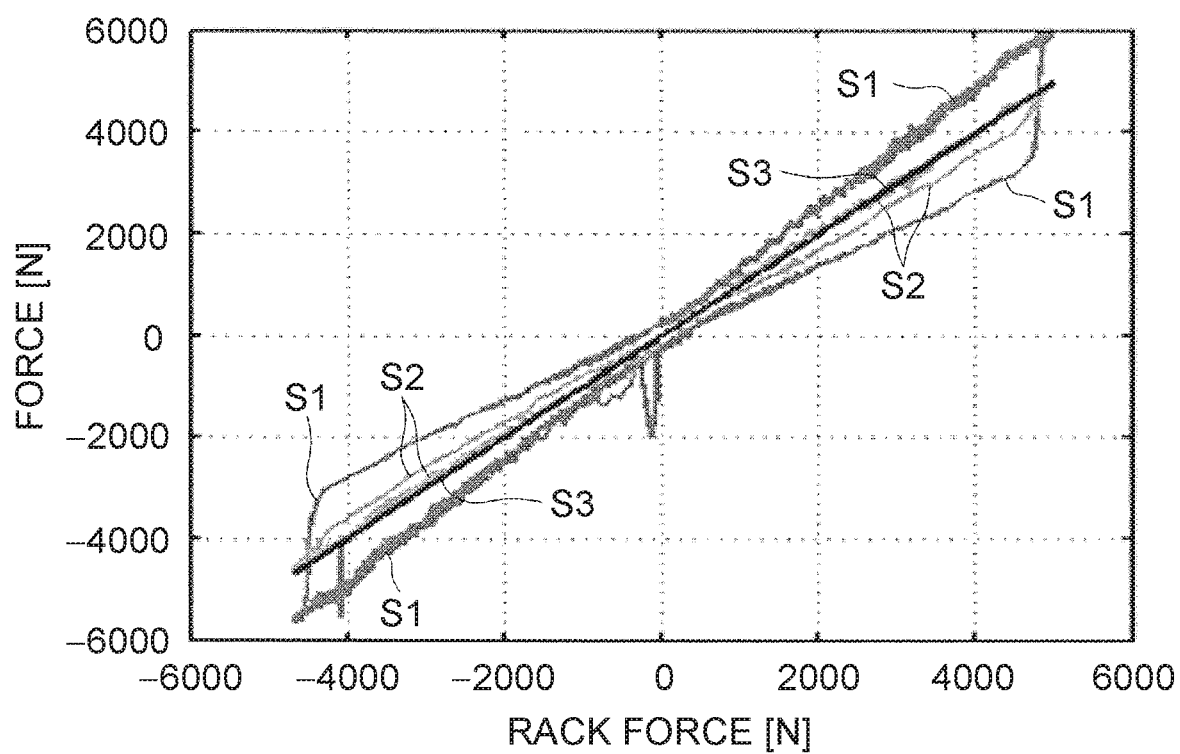
FIG. 9 is a graph showing relations between an actually measured rack axial force and the estimated rack axial force $\Delta F_r$, etc.

FIG. 8 is a graph showing changes that occur over time in the estimated rack axial force $\Delta F_r$ estimated by the rack axial force estimation unit 46 etc. when the steering wheel is repeatedly turned and returned. FIG. 9 is a graph showing relations between an actually measured rack axial force and the estimated rack axial force $\Delta F_r$ etc. In FIG. 8 and FIG. 9, the curve S1 is a graph representing a value obtained by converting the sum of the driving torque $i_{ww} \cdot T_m$ and the torsion bar torque $T_{tb}$ ($i_{ww} \cdot T_m + T_{tb}$) into a force in the rack axial direction. The curve S2 is a graph representing the estimated rack axial force $\Delta F_r$ estimated by the rack axial force estimation unit 46. The curve S3 is a graph representing the actually measured rack axial force. The actually measured rack axial force is plotted as abscissas in FIG. 9.

It can be seen from FIG. 8 and FIG. 9 that in this embodiment friction in the electric power steering system 1 is largely compensated for. Moreover, it can be seen from FIG. 8 that the error in estimating the rack axial force is larger during returning of the steering wheel than during turning of the steering wheel. A possible cause for this is the difference in friction torque between when turning the steering wheel by applying a force from the motor side and when returning the steering wheel from the column shaft side. Therefore, the present inventors have invented a friction torque estimation unit (hereinafter referred to as a modified example of the friction torque estimation unit) that can reduce the error in estimating the rack axial force compared with the friction torque estimation unit 48 of FIG. 6.

Figure 10:
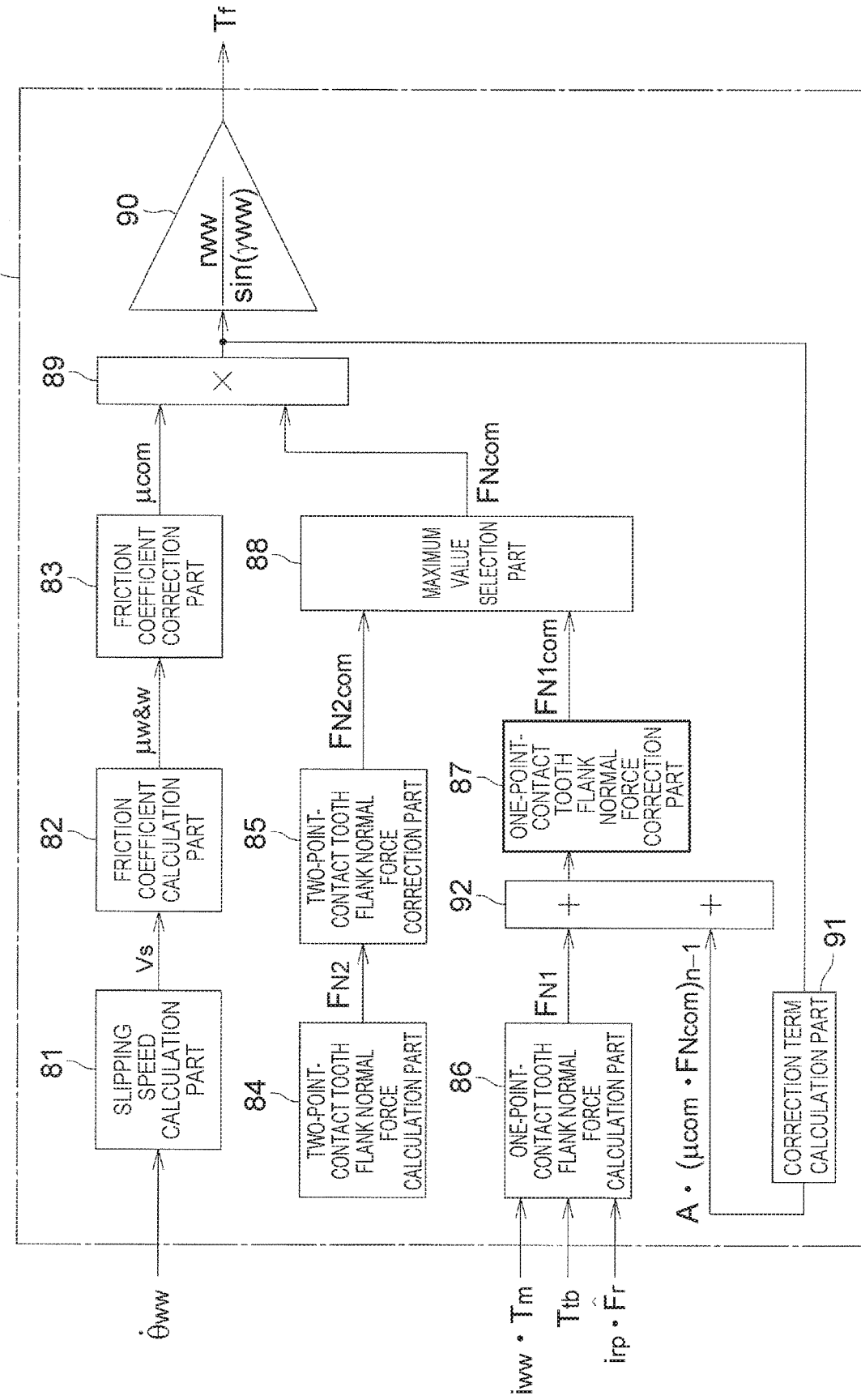
FIG. 10 is a block diagram showing the configuration of a modified example of the friction torque estimation unit.

FIG. 10 is a block diagram showing the configuration of the modified example of the friction torque estimation unit. Those parts of FIG. 10 that correspond to the above-described parts of FIG. 6 will be denoted by the same reference signs as in FIG. 6. A friction torque estimation unit 48A is different from the friction torque estimation unit 48 of FIG. 6 in that a correction term calculation part 91 and an addition part 92 (an example of the "first tooth flank normal force correction part" of the claims) are added.

The correction term calculation part 91 multiplies the last calculation result $(\mu_{com} \cdot F_{Ncom})_{n-1}$ of the multiplication part 89 by a predetermined correction gain A to calculate a correction term $A \cdot (\mu_{com} \cdot F_{Ncom})_{n-1}$. The addition part 92 adds the correction term $A \cdot (\mu_{com} \cdot F_{Ncom})_{n-1}$ to the tooth flank normal force $F_{N1}$ in the one-point contact state set by the one-point-contact tooth flank normal force calculation part 86 to correct the tooth flank normal force $F_{N1}$ in the one-point contact state. The corrected tooth flank normal force $(F_{N1} + A \cdot (\mu_{com} \cdot F_{Ncom})_{n-1})$ in the one-point contact state is given to the one-point-contact tooth flank normal force correction part 87.

The correction term $A \cdot (\mu_{com} \cdot F_{Ncom})_{n-1}$ is set such that the absolute value of the tooth flank normal force $F_{N1}$ in the one-point contact state becomes small during turning of the steering wheel and that the absolute value of the tooth flank normal force $F_{N1}$ in the one-point contact state becomes large during returning of the steering wheel. As a result, the absolute value of the combined friction torque $T_f$ becomes small during turning of the steering wheel and the absolute value of the combined friction torque $T_f$ becomes large during returning of the steering wheel. Thus, the error in estimating the rack axial force during turning and returning of the steering wheel can be reduced.

Also in this modified example, one of the tooth flank normal force $F_{N2}$ in the two-point contact state and the corrected tooth flank normal force $(F_{N1} + A \cdot (\mu_{com} \cdot F_{Ncom})_{n-1})$ in the one-point contact state, whichever has a larger absolute value, may be calculated as the tooth flank normal force $F_N$ of the speed reducer 19, and the obtained tooth flank normal force $F_N$ of the speed reducer 19 may be multiplied by a predetermined normal force correction factor to calculate the combined tooth flank normal force $F_{Ncom}$.

One of the tooth flank normal force $F_{N2}$ in the two-point contact state and the corrected tooth flank normal force $(F_{N1}+A\cdot(\mu_{com}\cdot F_{Ncom})_{n-1})$ in the one-point contact state, whichever has a larger absolute value, may be calculated as the tooth flank normal force $F_N$ of the speed reducer 19, and the obtained tooth flank normal force $F_N$ of the speed reducer 19 may be multiplied by the friction coefficient $\mu_{W\&W}$ of the speed reducer 19, and then this multiplication result $\mu_{W\&W}\cdot F_N$ may be multiplied by a predetermined friction torque correction factor to calculate the combined friction torque $T_f$.

In the above embodiment, the combined friction torque $T_f$ is estimated by using a plurality of values for calculating the meshing friction torque (first friction torque $T_{fW\&W}$) of the worm wheel 21 and the worm gear 20 and a plurality of correction factors. Alternatively, the combined friction torque $T_f$ may be estimated by using a plurality of values for calculating the meshing friction torque (second friction torque $T_{fR\&P}$) of the rack 17 and the pinion 16 and a plurality of correction factors. Further, the combined friction torque $T_f$ may be estimated by estimating the second friction torque $T_{fR\&P}$ and using the estimated second friction torque $T_{fR\&P}$ and a correction factor.

In the above embodiment, the example in which the present disclosure is applied to a column EPS has been shown. However, the present disclosure can be applied to any other EPSs having a plurality of transmission devices than a column EPS, including a rack-assist EPS in which an output of an electric motor is applied to a rack shaft. One example of such EPSs is a rack-parallel EPS in which a rotating force of an electric motor disposed parallel to a rack shaft is transmitted through a pulley and a belt to a ball screw mechanism installed on the rack shaft and the rack shaft is thereby moved. This EPS has two transmission devices, one is a transmission device composed of the pulley and the belt and the other is the ball screw mechanism.

Another example is a dual-pinion EPS in which a second pinion shaft that is not coupled to a steering shaft is provided other than the pinion shaft of FIG. 1 (hereinafter referred to as a first pinion shaft), and an electric motor is coupled to the second pinion shaft through a speed reducer. This EPS has three transmission devices, one is the speed reducer that transmits a rotating force of the electric motor to the second pinion shaft, and the others are two rack-and-pinion mechanisms. A rack-and-pinion mechanism composed of the second pinion shaft and the rack shaft serves as a third transmission device that is disposed on a power transmission path leading from the speed reducer to the rack shaft.

The present disclosure can also be applied to a steer-by-wire system. Various other design changes within the scope of the items described in the claims can be made to the present disclosure.

What is claimed is:

1. A steering system comprising:
    an electric motor;
    a wheel turning shaft that is moved in an axial direction by a torque of the electric motor so as to turn a wheel-to-be-turned;
    a plurality of transmission devices;
    an angular speed detection unit that detects or estimates an angular speed of the electric motor; and
    a controller that controls the electric motor, wherein:
    one of the transmission devices is a first transmission device that outputs rotation of the electric motor at a reduced speed;
    the controller has a combined friction torque estimation unit that estimates a combined friction torque combining friction torques occurring in the respective transmission devices; and
    the combined friction torque estimation unit has a slipping speed calculation part that calculates a slipping speed of the first transmission device based on the angular speed, a friction coefficient calculation part that calculates a friction coefficient of the first transmission device based on the slipping speed, a tooth flank normal force calculation part that calculates a normal force acting on a tooth flank of the first transmission device, and a friction torque calculation part that calculates the combined friction torque using the friction coefficient of the first transmission device, the tooth flank normal force of the first transmission device, and one or more preset correction factors.

2. The steering system according to claim 1, wherein the friction torque calculation part is configured to calculate the combined friction torque based on a combined friction coefficient and a combined tooth flank normal force, the combined friction coefficient being a value obtained by multiplying the friction coefficient by a predetermined first correction factor of the one or more preset correction factors, the combined tooth flank normal force being a value obtained by multiplying the tooth flank normal force by a predetermined second correction factor of the one or more preset correction factors.

3. The steering system according to claim 1, wherein the friction torque calculation part is configured to calculate the combined friction torque by calculating a first friction torque occurring in the first transmission device based on the friction coefficient and the tooth flank normal force and then multiplying the obtained first friction torque by a predetermined third correction factor of the one or more preset correction factors.

4. The steering system according to claim 1, further comprising:
    a steering member; and
    a steering shaft that rotates integrally with the steering member, wherein:
    the first transmission device is a transmission device that outputs the torque of the electric motor to the steering shaft or the wheel turning shaft; and
    another of the transmission devices is a second transmission device that converts rotation of the steering shaft into axial motion of the wheel turning shaft.

5. The steering system according to claim 4, further comprising a torque detection unit that detects a steering torque input from the steering member, wherein the controller has an axial force estimation unit that estimates an axial force acting on the wheel turning shaft based on the steering torque, the torque of the electric motor, the combined friction torque, and an angle of the electric motor.

6. The steering system according to claim 4, further comprising:
    a torque detection unit that detects a steering torque input from the steering member; and
    an axial force estimation unit that detects or estimates an axial force acting on the wheel turning shaft, wherein the tooth flank normal force calculation part sets a first contact force, calculated based on the torque of the electric motor, the steering torque, and the axial force, as the tooth flank normal force when the first contact force is larger than a predetermined value, and sets the predetermined value as the tooth flank normal force when the first contact force is equal to or smaller than the predetermined value.

7. The steering system according to claim 1, further comprising:
a steering member;
a steering shaft that rotates integrally with the steering member;
a torque detection unit that detects a steering torque input from the steering member; and
an axial force estimation unit that detects or estimates an axial force acting on the wheel turning shaft, wherein:
the first transmission device is a transmission device that outputs a torque of the electric motor to the steering shaft or the wheel turning shaft;
another of the transmission devices is a second transmission device that converts rotation of the steering shaft into axial motion of the wheel turning shaft;
the tooth flank normal force calculation part is configured to calculate a first tooth flank normal force that is the normal force acting on the tooth flank of the first transmission device in a first contact state, based on the torque of the electric motor, the steering torque, and the axial force, and set a second tooth flank normal force that is the normal force acting on the tooth flank of the first transmission device in a second contact state; and
the friction torque calculation part is configured to calculate a combined first tooth flank normal force by multiplying the first tooth flank normal force by a predetermined fourth correction factor of the one or more preset correction factors, calculate a combined second tooth flank normal force by multiplying the second tooth flank normal force by a predetermined fifth correction factor of the one or more preset correction factors, calculate a combined friction coefficient by multiplying the friction coefficient by a predetermined sixth correction factor of the one or more preset correction factors, and calculate the combined friction torque based on one of the combined first tooth flank normal force and the combined second tooth flank normal force, whichever has a larger absolute value, and on the combined friction coefficient.

8. The steering system according to claim 7, wherein:
the tooth flank normal force calculation part has a first tooth flank normal force correction part that corrects the first tooth flank normal force based on a combined friction torque calculated last time by the friction torque calculation part; and
the friction torque calculation part is configured to calculate the combined first tooth flank normal force by multiplying the corrected first tooth flank normal force by the fourth correction factor, calculate the combined second tooth flank normal force by multiplying the second tooth flank normal force by the fifth correction factor, calculate the combined friction coefficient by multiplying the friction coefficient by the sixth correction factor, and calculate the combined friction torque based on one of the combined first tooth flank normal force and the combined second tooth flank normal force, whichever has a larger absolute value, and on the combined friction coefficient.

* * * * *